June 23, 1953     G. W. PEACOCK, SR     2,642,791
DETACHABLE ROOT CUTTER
Filed Sept. 20, 1948     2 Sheets-Sheet 1
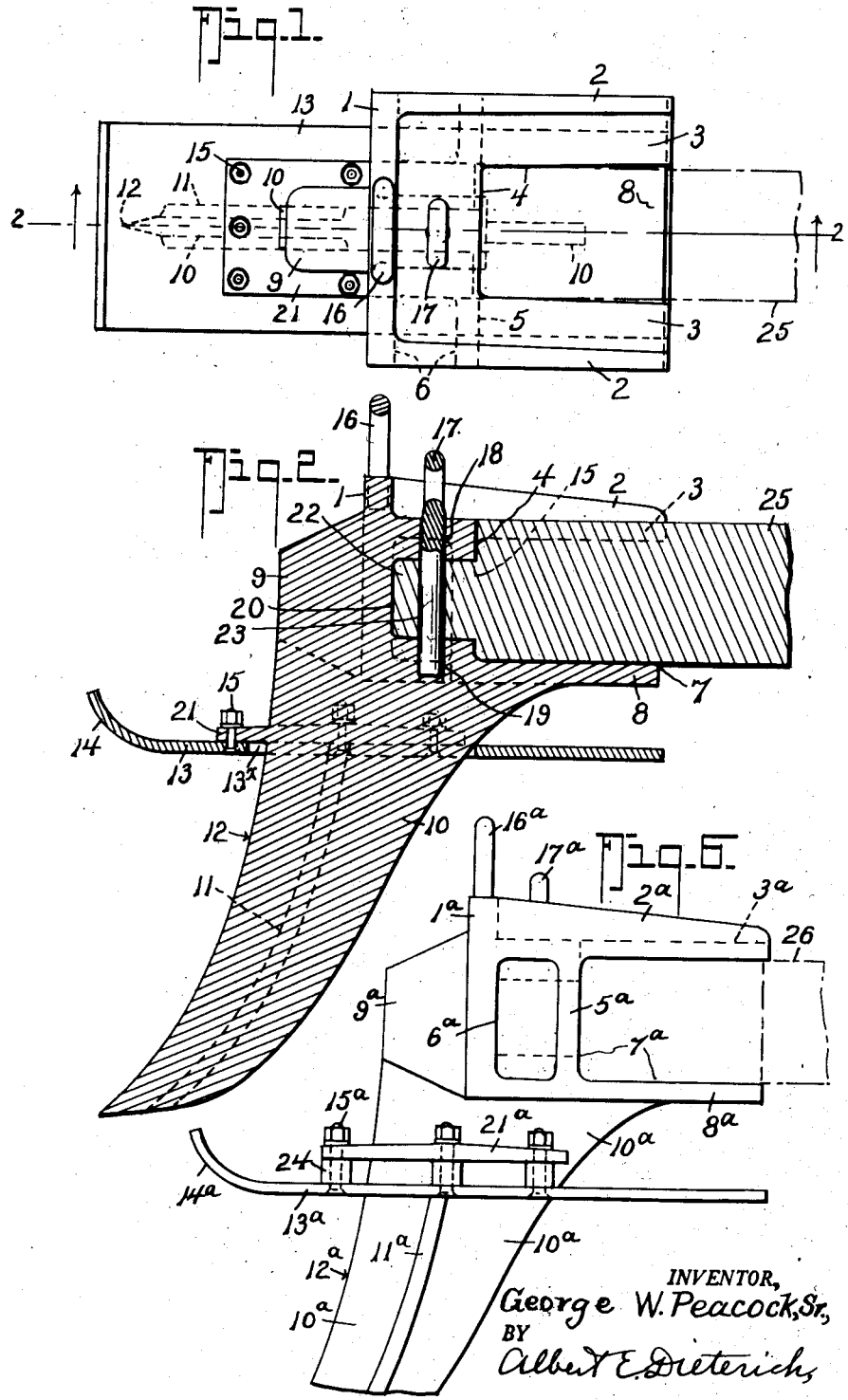
INVENTOR,
George W. Peacock, Sr.,
BY
Albert E. Dieterich
ATTORNEY.

June 23, 1953 G. W. PEACOCK, SR 2,642,791
DETACHABLE ROOT CUTTER
Filed Sept. 20, 1948 2 Sheets-Sheet 2
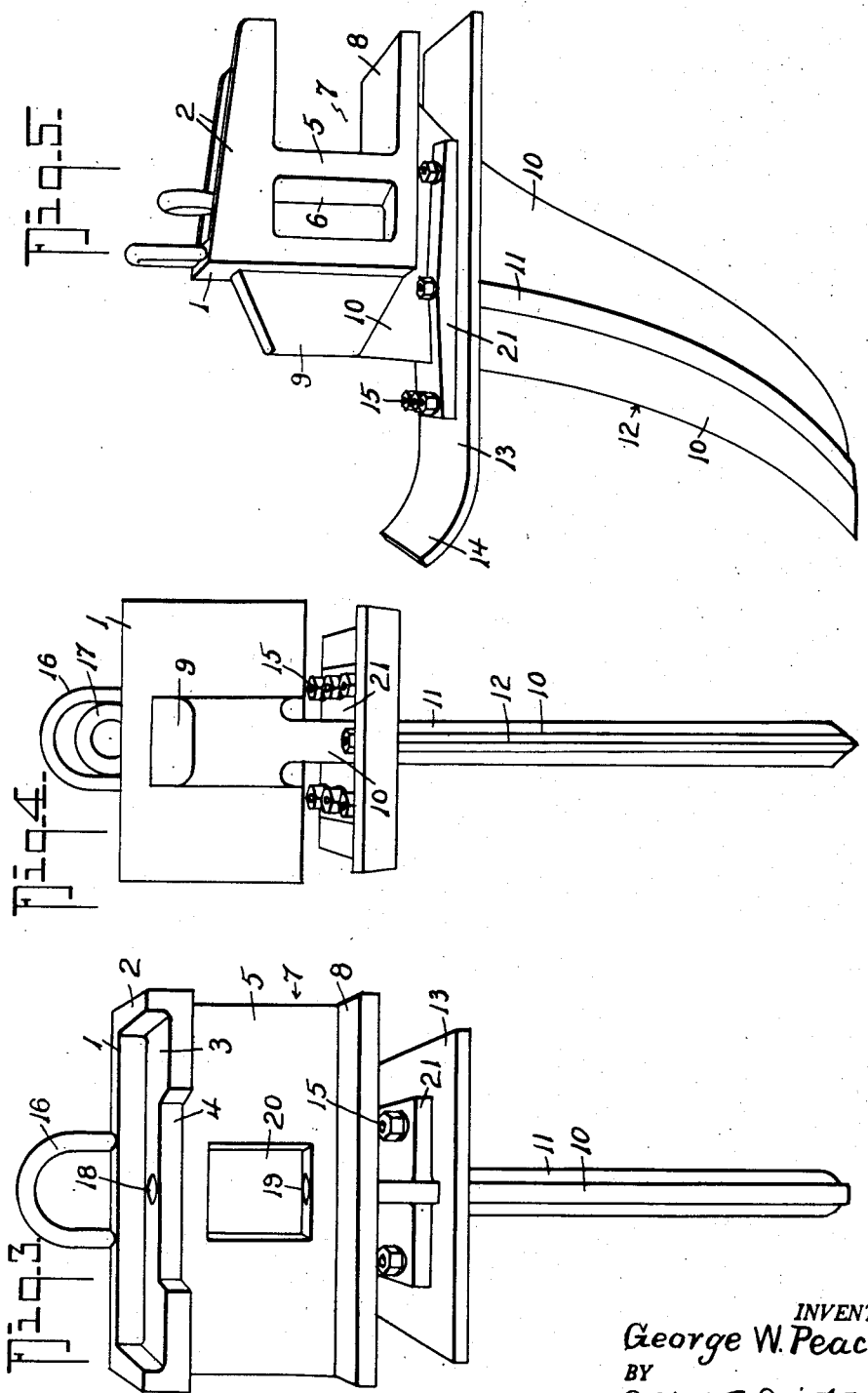
INVENTOR,
George W. Peacock, Sr.,
BY
Albert E. Dieterich,
ATTORNEY.

Patented June 23, 1953

2,642,791

UNITED STATES PATENT OFFICE 2,642,791

DETACHABLE ROOT CUTTER

George W. Peacock, Sr., Jacksonville, Fla., assignor of one-fourth to George W. Peacock, Jr., one-fourth to Thomas W. Peacock, and one-half to Franklin G. Russell, all of Jacksonville, Fla.

Application September 20, 1948, Serial No. 50,051

2 Claims. (Cl. 97—226.1)

1

My invention is a cutter unit for use with tractors, especially those of the bulldozer types, for cutting large and small roots of trees in land clearing operations.

The invention has for its objects:

1. To provide a one-piece cutter and socket for attachment to a push bar or to an A-frame of a push type tractor or bulldozer.

2. To provide means, as a part of the one-piece structure, for detachably supporting a skid plate and depth gauge on the cutter unit and to provide for adjusting the position of the plate for different depths.

3. To provide a root cutter for use as a lateral root cutter and sub-soiler, which can be readily attached to and detached from the push bar or the A-frame of pusher-type tractors or bulldozers of known construction.

To the attainment of the aforesaid objects and ends the invention resides in the novel features of construction, combination and arrangement of parts which will hereinafter first be described in detail and then be specifically pointed out in the accompanying drawings in which:

Fig. 1 is a top plan view of my invention.

Fig. 2 is a vertical section of the same on the line 2—2 of Fig. 1.

Fig. 3 is a perspective view of the cutter taken looking at the rear of the same.

Fig. 4 is a front perspective view of the same taken at a different distance from the object than Fig. 3 was taken.

Fig. 5 is a side perspective view of the same.

Fig. 6 is a side elevation of the device showing spacers for adjusting the gauge plate.

In the drawings in which like numerals and letters of reference indicate like parts in all the figures, 1 represents the front and vertical wall of the socket member of the cutter, 2 the side walls of the same, 3 the upper horizontal wall (which has a cut-away portion or slot 4), 5 the back vertical wall, 6 the weight reducing recesses in the sides of the socket member, 8 the bottom wall of the same and 7 the space between that wall and the wall 3. The parts 1 to 8 comprise the socket member. The socket member also has a recess 20 for the lug 22 of the push bar 25 of a tractor or bulldozer, as indicated in dot and dash lines in Fig. 1 and in full lines in Fig. 2. Pin holes 18 and 19 are provided in the socket member and a pin hole 23 is provided in the lug 22 for receiving a coupling pin 17.

The blade 10 is cast integral with the socket member and has an enlargement or head portion 9, side ribs 11 and a sharpened or V-shaped cutting edge 12. Also cast integral with the blade or made separate and welded to the blade as an integral part of it is a flange plate 21 to which is secured by bolts and nuts 15, a gauge plate or shoe 13, which is slotted as at 13ˣ to fit over the blade 10 and rib 11. The front portion of the plate 13 is turned up as at 14 to ride freely over the surface of the ground.

Secured to the socket member, at the front thereof, is a loop 16 to which a lifting or carrying chain or cable may be fastened when assembling the cutter and push bar. The loop 16 is preferably so positioned that those parts in front of the loop will more or less counterbalance those parts to the rear of the loop to hold the cutter in about the position shown in Fig. 2.

The skid 13 may be adjusted to different positions below flange plate 21 by the use of spacers 24 as shown in Fig. 6, according to the depth the blade is to penetrate the ground. In Fig. 6 those parts which correspond to like parts in the preceding figures bear the same reference numbers plus the index letter *a* so a repetition of the description of the same here is thought unnecessary.

In Fig. 6, the A-frame portion to which the cutter is attached is indicated by dot and dash lines 26.

The cutter of my invention has been especially designed for cutting the roots of large trees which cannot be cut by the ordinary cutters now in common use.

From the foregoing description taken in connection with the accompanying drawings it is though the construction, operation and advantages of my invention will be clear to those skilled in the art.

What I claim is:

1. In a root cutter, an integral structure comprising a socket member, a cutter blade depending from said member and a flange plate on the blade below the socket member, said socket member including a front vertical wall, vertical side walls, an upper horizontal wall and a lower horizontal wall, and a back wall, the side walls and the upper horizontal wall having cut-away portions, said socket member having a lug-receiving recess opening through said back wall, said socket member having coupling pin holes in vertical alignment with said recess opening.

2. In a root cutter, an integral structure comprising a socket member, a cutter blade depending from said member and a flange plate on the blade below the socket member, said socket member including a front vertical wall, vertical side walls, an upper horizontal wall and a lower horizontal wall, and a back wall, the side walls and the upper horizontal wall having cut-away portions, said socket member having a lug-receiving recess opening through said back wall, said socket member having coupling pin holes in vertical alignment with said recess opening, and a gauge plate mounted on said cutter blade and secured to said flange plate.

GEORGE W. PEACOCK, Sr.

References Cited in the file of this patent

UNITED STATES PATENTS

| Number | Name | Date |
|---|---|---|
| 1,033,574 | Freeman | July 23, 1912 |
| 1,507,833 | Jarmin | Sept. 9, 1924 |
| 1,722,063 | Spitzenberg | July 23, 1929 |
| 1,927,818 | Brodersen | Sept. 26, 1933 |
| 2,491,208 | Price et al. | Dec. 13, 1949 |

FOREIGN PATENTS

| Number | Country | Date |
|---|---|---|
| 26,427 of 1930 | Australia | May 12, 1930 |